Patented Dec. 30, 1930

1,786,890

UNITED STATES PATENT OFFICE

CARL ALFRED BRAUN, OF MUNICH, GERMANY

METHOD OF MANUFACTURING CELLULOSE AND TEXTILE FIBERS FROM VEGETABLE MATTER

No Drawing. Application filed August 15, 1927, Serial No. 213,194, and in France July 4, 1927.

My invention relates to the manufacture of cellulose or textile fibers or both at the same time from suitable vegetable materials, such as straw, stalks and organic substances of a more ligneous nature such as fir-pine-wood and the like, with the aid of mono-sulphites of alkali metals, preferably monosulphite of sodium or potassium.

Generally speaking, it is a known fact that by treating straw, wood and similar vegetable substances with a sufficiently concentrated solution of mono-sulphite salts, such as mono-sulphite of sodium, at a certain temperature and pressure, cellulose is obtained which forthwith or after having been subjected to a bleaching operation, may be used for purposes of manufacturing paper and the like, see Schwalbe, Chemistry of Cellulose, pages 426 and 427.

Further it is known to produce in a similar manner, that is by means of mono-sulphites, textile fibers either alone or mixed with shorter cellulose fibers, from vegetable substances suitable for the purpose. The amounts of alkali mono-sulphites required for the purpose, however, especially if readily bleachable fibers devoid of fragments are to be obtained, are so large as to render the method unprofitable so that the same has not been practiced hitherto.

Furthermore, it has been suggested heretofore to employ mono-sulphites, particularly a solution of mono-sulphite of sodium containing a large proportion of caustic hydroxides of sodium or potassium, for purposes of developing, breaking up or disintegrating vegetable materials, the alkaline hydroxides acting, due to the caustic nature thereof, to greatly improve or increase the breaking up effect of the mono-sulphite compound so that the quantity of the latter can be appreciably reduced. But even in this case the amounts of mono-sulphite and alkaline hydroxides required for the purpose, are so great that economy is not realized unless a separate plant or apparatus is provided for recovering the sodium salts from the waste lye. Also the method is not practicable for the reason that the recovery of the sodium compounds from the waste lye involves difficulties due to the bad and offensive smell of the volatile sulphur compounds formed, and other annoyances such as pollution of the ground and water.

I have attempted to improve the last recited method and to reduce the amount of mono-sulphite salts by subjecting the vegetable substances to a preliminary treatment with boiling water in order to remove the water-soluble constituents thereof which otherwise will consume mono-sulphite. Caustic alkali is also employed in this modified method but in a smaller proportion, only such as will be sufficient to dissolve the dyes contained in the vegetable substances and which are reduced by the action of the monosulphite salt, see German patent specification No. 388,998.

In fact, in developing the method to a commercial scale in this way I have succeeded in reducing the amount of mono-sulphites and caustic alkali required for the purpose to an appreciable degree so that the method is absolutely economical without the necessity of recovering the sodium salts. A disadvantage offered by this improved method, however, resides in that the preliminary treatment with boiling water and the employment of slightly alkaline solutions of mono-sulphite salts considerably protract the duration of the boiling operation.

It has been found in practice that the liberation of sulphurous acid—$SO_2$—from the alkali mono-sulphite proceeds very slowly in weak solutions and sometimes even discontinues unless the temperature is raised considerably above 170° C. Hence there results a reduction in the daily output or efficiency as compared with that of the old methods, or the necessity of enlarging the boiling plant.

Now, I have found after much study and research that both the preliminary treatment of the vegetable substances with hot water may be entirely dispensed with and a reduction of the boiling time below the normal duration is possible, if alkali salts are added to the mono-sulphite solution which consist of a strong base such as the alkali, and a weak acid so as to be capable of ready decomposition at the boiling temperature and of delivering the base to the encrusting constituents of the boiled material so that the acid will be free. The thus freed weak acid acts on the sulphurous acid—$SO_2$—of the alkali mono-sulphite in so far as to highly accelerate the liberation thereof. A further advantage resides in the reduction of cost owing to a considerable saving of caustic alkali.

As regards the alkali salts suitable for the purposes of my invention, they comprise mainly the resin and fatty acid compounds of the alkali metals (soaps), the silicates of the same such as sodium silicate (waterglass), the borates, aluminates, zincates and similar compounds. In treating vegetable substances of the above indicated nature with a sulphite solution containing any of the above stated alkali compounds, according to my invention, it has been found to be of advantage to add a small amount of alkali carbonate to the said solution.

I shall now proceed to describe, by way of example, the manner in which I preferably carry out my invention.

In a suitable rotary boiler I mix 1000 kg. of chopped straw with 2000 l. of a solution or liquor containing 85 kg. of sulphite of sodium—$Na_2SO_3$;
35 kg. of silicate of sodium—$Na_2SiO_3$;
20 kg. of sodium hydrate—$NaOH$ and
5 kg. of sodium carbonate—$Na_2CO_3$.

The boiler closed, the charge is heated gently for about thirty minutes by means of direct steam whilst the boiler is rotated, for the purpose of thoroughly mixing the charge, whereupon the air and steam evolved in the boiler are allowed to escape therefrom. In the next stage steam is again admitted to the constantly rotating boiler to raise the temperature quickly to 160° C., at a correspondingly high pressure, and this operation is continued for four hours. The steam evolved in the boiler is then allowed to flow off and the treated material separated from the liquor. The same is well developed or broken up and in best condition for the usual further treatment for the purpose aimed at.

If the silicate would not have been added to the sulphite solution, 35 kg. of caustic soda and a boiling period of five and a half or six hours at the temperature of 160° C. would be necessary to get a similar result.

Apparently the sodium silicate—$Na_2SiO_3$—acts to break up or develop the material under treatment and to thereby accelerate the operation. This I suppose may be due to the fact that the basic constituent of the silicate combines with the encrusting constituents of the vegetable material so that silicic acid will be set free in a fine colloidal form. This may be concluded from the fact that the lye or liquor first opalesces and finally has a turbid appearance, while the silicic acid in turn acts to liberate small amounts of sulphurous acid—$SO_2$—from the mono-sulphite of sodium and to thereby assist in causing sulphurous acid to be liberated and combine with cellulose and accelerate the operation.

Briefly the action of the silicate or similar compounds may be explained and understood by supposing that the liberated silicic acid—$SiO_2$—co-operates with the weak acids disengaged from the vegetable material to bring about an enrichment of the liquor as regards its free acid content, said enrichment balancing to a certain degree the high excess in alkali without however consuming or neutralizing the latter, and to thereby cause the sulphurous acid to be liberated or combine with cellulose and accelerate the operation.

For this reason also I find it necessary to add a small amount of alkali carbonate to the sulphite solution since the carbonate does not change or decompose during the boiling process and acts to maintain the solution in alkaline condition or of alkaline reaction. I have found that in cases where an alkali carbonate is not added to the sulphite liquor the latter sometimes is, at the end of the boiling operation, of a slight acid reaction whereby the vegetable material will be badly influenced as regards development, colour and bleaching capability. On the other hand, it is true, any excess of alkali carbonate must be avoided.

From the foregoing, it is believed that the advantages and novel features of my invention will be readily understood and, therefore, further detail description is deemed unnecessary.

In reducing my invention to practice I find that the example referred to herein as a preferred way of carrying out my invention is most efficient, but realizing that certain conditions will necessarily vary in concurrence with the adoption of my improved method, I desire to emphasize the fact that various changes and modifications may be made therein when required or desired without departing from the true spirit of the invention and without sacrificing any of the advantages of my invention as defined in the appended claims.

What I claim is:—

1. The method of manufacturing cellulose and textile fibers from vegetable material, consisting in treating the vegetable material, at boiling temperature and corresponding pressure, with a sulphite solution initially containing caustic alkali and alkali salts of weak acids.

2. The method of manufacturing cellulose and textile fibers from vegetable material, consisting in treating the vegetable material, at boiling temperature and corresponding pressure, with a sulphite solution initially containing caustic alkali and an alkali salt of a weak acid chosen from the group comprising resins, fatty acids, silicates, borates, aluminates, and zincates.

3. The method of manufacturing cellulose and textile fibers from vegetable material, consisting in treating the said vegetable material, at boiling temperature and corresponding pressure, with a solution of an alkali mono-sulphite initially containing caustic alkali, an alkali salt of a weak acid chosen from the group comprising resinic acids, fatty acids, silicic acid, boric acid, aluminates, zincates and a small proportion of alkali carbonate.

In testimony whereof I have affixed my signature.

CARL ALFRED BRAUN.